(12) United States Patent
Zhuang

(10) Patent No.: US 12,333,842 B2
(45) Date of Patent: Jun. 17, 2025

(54) SYSTEM FOR DETERMINING CORRECTION OF HANDWRITING CHINESE CHARACTERS

(71) Applicant: Jianming Zhuang, Shenzhen (CN)

(72) Inventor: Jianming Zhuang, Shenzhen (CN)

(*) Notice: Subject to any disclaimer, the term of this patent is extended or adjusted under 35 U.S.C. 154(b) by 276 days.

(21) Appl. No.: 18/146,470

(22) Filed: Dec. 27, 2022

(65) Prior Publication Data

US 2024/0212378 A1 Jun. 27, 2024

(51) Int. Cl.
| | |
|---|---|
| *G06V 30/28* | (2022.01) |
| *G06V 30/148* | (2022.01) |
| *G06V 30/18* | (2022.01) |
| *G06V 30/19* | (2022.01) |
| *G06V 30/22* | (2022.01) |
| *G09B 19/06* | (2006.01) |

(52) U.S. Cl.
CPC .......... *G06V 30/287* (2022.01); *G06V 30/148* (2022.01); *G06V 30/1801* (2022.01); *G06V 30/19013* (2022.01); *G06V 30/22* (2022.01); *G09B 19/06* (2013.01)

(58) Field of Classification Search
CPC ............... G06V 30/287; G06V 30/148; G06V 30/1801; G06V 30/19013; G06V 30/22; G09B 19/06
See application file for complete search history.

(56) References Cited

U.S. PATENT DOCUMENTS 4,850,026 A * 7/1989 Jeng ................. G06F 18/21
382/209

FOREIGN PATENT DOCUMENTS

| CN | 104063723 A | * 9/2014 | |
| CN | 106776499 A | * 5/2017 | ............... A63F 9/06 |
| WO | WO-2020199513 A1 | * 10/2020 | ............. G09B 11/00 |

* cited by examiner

*Primary Examiner* — Amandeep Saini
*Assistant Examiner* — Daniella M. DiGuglielmo

(57) ABSTRACT

A system for determining correction of handwriting Chinese characters includes a Chinese character collector for collecting template Chinese characters which is inputted by handwriting. A feature classifier is connected to a pre-processor for automatically classifying features of the template Chinese characters. Text features of the template Chinese characters are acquired by a program. A tested handwriting Chinese character collector is connected to the feature classifier for collecting the handwriting Chinese characters to be tested. Exact external rectangles and mass centers of the handwriting Chinese characters to be tested are calculated, which are inputted to the feature classifier and the text features for the handwriting Chinese characters to be tested are calculated. A feature comparator is connected to the feature classifier and serves to compare the text features of a handwriting Chinese character to be tested with feature sets stored in a feature set database.

6 Claims, 3 Drawing Sheets

SYSTEM FOR DETERMINING CORRECTION OF HANDWRITING CHINESE CHARACTERS

FIELD OF THE INVENTION

The present invention is related to determination of handwriting Chinese characters, and in particular to a system for determining correction of handwriting Chinese characters.

BACKGROUND OF THE INVENTION

With the development of China in the world, Chinese characters have become a very popular language and more and more people use Chinese characters in daily life. Generally, a Chinese character includes at least one component (radical), each component being formed by several strokes. Generally, a Chinese character includes two or more components.

Because there are many different components (radicals) used in Chinese characters, for a foreigner, it is often that he or she may be wrong in writing of the Chinese characters due to errors of the components (radicals), or the arrangement of several components in one Chinese character. However, it is difficult for foreigners to identify the errors in writing of the Chinese characters. Therefore, there is an eager demand for a computer recognition way to identify correctness of a Chinese character.

Currently, there are several novel utilities aiming for identification of Chinese characters, while all these methods are based on the strokes, orders of writing, direction arrangements of the Chinese characters, while no method is related to the corrections of the components of the Chinese character.

However, the Chinese characters written by a new learner of the Chinese language may have errors. Therefore, there is an eager demand for a software which can calibrate the faults in writing of the Chinese characters in real time.

Therefore, the object of the present invention is to provides provide a novel way for finding errors in the components of Chinese characters as a writer writes Chinese character.

SUMMARY OF THE INVENTION

Accordingly, the object of the present invention is to provide a system for determining correction of handwriting Chinese characters, wherein: in the present invention, the text features 1 to 11 of sampled template Chinese characters are calculated and stored in the feature set database. Then the text features of a handwriting Chinese character to be tested is also calculated. Then the two text features are compared, if they are matched, it is considered that the handwriting Chinese character to be tested has a correct handwriting way for the Chinese character. The result is feedback to the user. Therefore, the faults of the writer can be indicated in time as the user writes a Chinese character. Therefore, the present invention is helpful for learning Chinese. A learner can know whether the Chinese character written now is correct or wrong real time. As a result, learning efficiency is promoted quickly.

To achieve the above object, the present invention provides a system for determining correction of handwriting Chinese characters, including: a Chinese character collector for collecting template Chinese characters which is inputted by handwriting; components of the template Chinese characters are of correct component structures; a feature classifier connected to a pre-processor for automatically classifying of features of the Chinese characters; that is, to obtain a rectangle frame of each component of a Chinese character and to calculate a mass center of the rectangle frame; then text features of these handwriting Chinese characters are acquired by a program; text features of different handwriting Chinese characters expressing the same Chinese character are compared; if for the same Chinese character, the handwriting Chinese characters have the same text feature, then this text feature is marked as a necessary text feature of the Chinese character, if not, this text feature is not regarded as a necessary text feature which is neglected; the results from the comparison are stored as a template of the text feature of the Chinese character; a tested handwriting Chinese character collector connected to the feature classifier for collecting handwriting Chinese characters to be tested; the exact external rectangles and mass centers of these handwriting Chinese characters to be tested being calculated, which are inputted to the feature classifier and the text features for these handwriting Chinese characters to be tested are calculated; a feature comparator connected to the feature classifier and the feature set database; the feature comparator acquiring text features of the handwriting Chinese character from the feature classifier; then the feature comparator comparing the text features of a the handwriting Chinese character to be tested with the features set of the sampled template Chinese character originally stored in the feature set database are compared; if they match completely, it is said that the handwriting Chinese character to be tested is correct, and a result is outputted.

DETAILED DESCRIPTION OF THE INVENTION

In order that those skilled in the art can further understand the present invention, a description will be provided in the following details. However, these descriptions and the appended drawings are only used to cause those skilled in the art to understand the objects, features, and characteristics of the present invention, but not to be used to confine the scope and spirit of the present invention defined in the appended claims.

Figure 1:
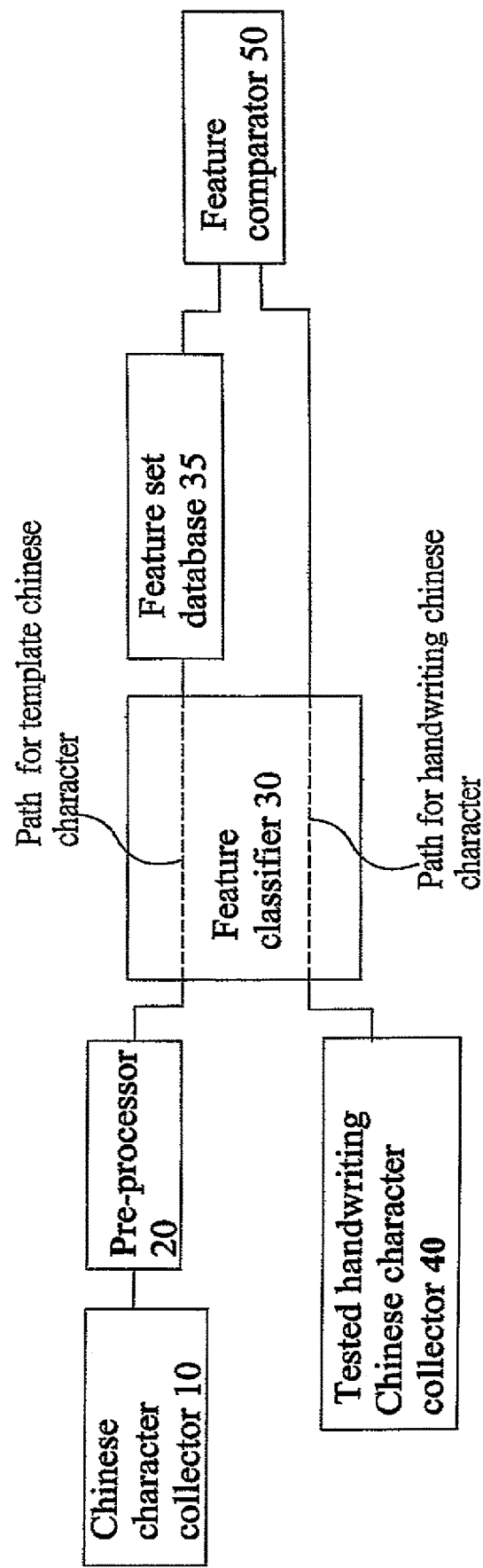
FIG. 1 shows the structure of the present invention.
Figure 2:
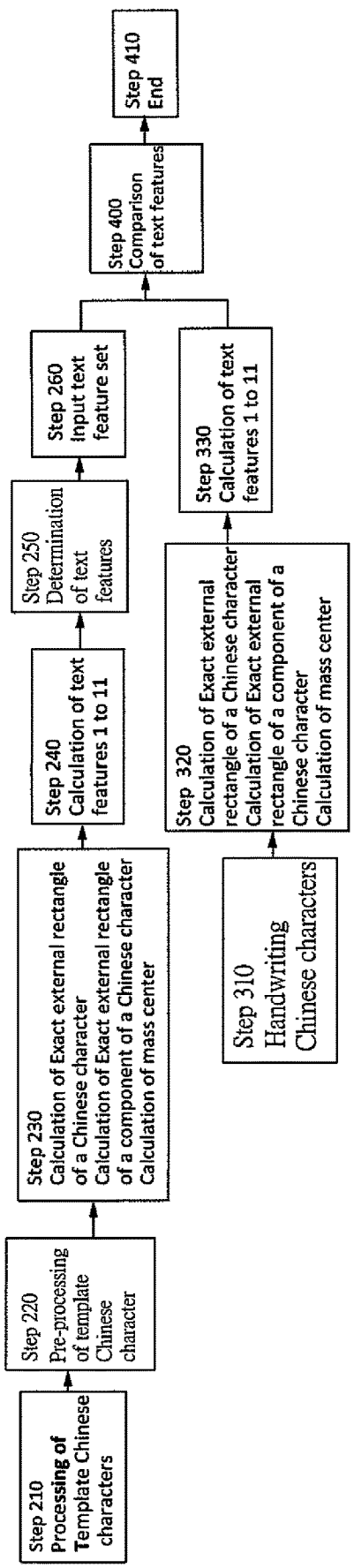
FIG. 2 shows an operation flow of the present invention.

Referring to FIGS. 1 and 2, the system of the present invention is illustrated. The present invention relates to the determination of corrections of the components (radicals) of a handwriting Chinese character. In that the components (radicals) of a Chinese character mean basic construction structures which form a Chinese character, for example the Chinese character 明containing the components of 日and 月, or the Chinese character 評contains the component of 言and 平which are basic construction units of a Chinese character.

The present invention includes the following components.

A Chinese character collector 10 serves for collecting template Chinese characters which is inputted by handwriting. The components of the template Chinese characters are of correct component structures. Data enhancing methods are used to cause the template Chinese characters to be extended to various different forms (this is known in the prior art, and thus the details will not be further described herein) (step 210). The Chinese character collector 10 is, for instance, a handwriting input device of a tablet computer. In the present invention, a template Chinese character is detached into different strokes. Each stroke is formed by a plurality of sampling points.

In the present invention, the template Chinese character means a correct Chinese character with correct components and a correct arrangement of these components. The template Chinese character is rendered to have different forms (this is known in the prior art and the details will not be further described herein). A trainer inputs handwriting Chinese characters in a handwriting device, and the system collects these handwriting Chinese characters for standardization and interpolation (these are known in the prior art, and thus the details will not be further described).

A pre-processor 20 is connected to the Chinese character collector 10 for collecting pre-processing collected template Chinese characters. In the present invention, the pre-processing includes the processes of data enhancement, generating a plurality of template Chinese characters based on the collected Chinese characters (this is known in the prior art). The data pre-processing includes standardization, interpolation, etc. of the handwriting Chinese characters (step 220).

A feature classifier 30 is connected to the pre-processor 20 for automatically classifying features of the Chinese characters, That is, to obtain a rectangle frame of each component of a Chinese character and to calculate a mass center of the rectangle frame (step 230). Then text features of these handwriting Chinese characters are acquired by a program (step 240). Text features (will be defined in the following) of different handwriting Chinese characters expressing the same Chinese character are compared. If for the same Chinese character, the handwriting Chinese characters have the same text features, then this text feature is marked as a necessary text feature of the Chinese character, if not, this text feature is not regarded as a necessary text feature which is neglected. The results from the comparison are stored as a template of the text feature of the Chinese character.

The feature classification means to analyze one Chinese character to get the text feature of this Chinese character, some of which is necessary and others are unnecessary. The necessary text feature are captured and the unnecessary text feature is deserted.

Calculation and selections of the text feature of components of Chinese characters are described hereinafter.
Calculation of an Exact External Rectangle.
(1) Calculating an Exact External Rectangle of a Whole Chinese Character.

A Chinese character (including printed or handwriting Chinese characters) has n strokes. Numbers of sampling points of different strokes are not identical. Each Chinese character is expressed by the following sampling points:

$$P = \{line_1[(p_1(x_0, y_0), (p_1(x_1, y_1)...],$$
$$line_2[(p_2(x_0, y_0), (p_2(x_1, y_1)...],$$
$$\square$$
$$line_n[(p_n(x_0, y_0), (p_n(x_1, y_1)...]\}$$

Where P expresses the Chinese character, $line_j$ expresses the jth stroke of the Chinese character P, $p_i$ expresses coordinates of $p_i$ in the stroke is $x_k$ and $y_k$.

The exact external rectangle box of the Chinese character means a minimum rectangle which can enclose the Chinese character. At first, the $line_j$ ($X_{min}$, $X_{max}$, $Y_{min}$, $Y_{max}$) of each stroke is calculated, and then the extreme values Box ($X_{min}$, $X_{min}$, $Y_{min}$, $Y_{max}$) at four sides of the exact external rectangle of each the stroke of the Chinese character is calculated, that is:

$$Box_{X\_max} = Max(line_1 X_{max}, line_2 X_{max}...line_n X_{max})$$
$$Box_{X\_min} = Min(line_1 X_{min}, line_2 X_{min}...line_n X_{min})$$
$$Box_{Y\_max} = Max(line_1 Y_{max}, line_2 Y_{max}...line_n Y_{max})$$
$$Box_{Y\_min} = Min(line_1 Y_{min}, line_2 Y_{min}...line_n Y_{min})$$

Figure 3:
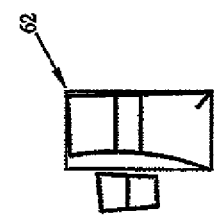
FIG. 3 shows another embodiment of the present invention.
Figure 3:
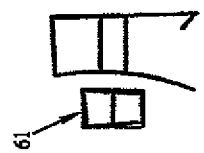
Figure 3:
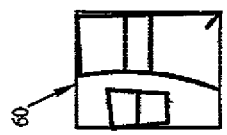

Max means maximum value. The exact external rectangle 60 includes the four extreme values $Box_{X\_max}$, $Box_{X\_min}$, $Box_{Y\_max}$, and $Box_{Y\_min}$ at four sides of the exact external rectangle, as shown in FIG. 3.

(2) Calculating an Exact External Rectangle of a Component of a Chinese Character.

For instance, a Chinese character 明 is formed by two components 日 and 月, and thus the exact external rectangle for the 日 and 月 are calculated individually.

Firstly, the exact external rectangle for 日 is calculated as following. The extreme values at four sides of the exact external rectangle of the component 日 is calculated, that is:

$$Box_{日\ X\_max} = Max(line_1 X_{max}, line_2 X_{max}...line_4 X_{max})$$
$$Box_{日\ X\_min} = Min(line_1 X_{min}, line_2 X_{min}...line_4 X_{min})$$
$$Box_{日\ Y\_max} = Max(line_1 Y_{max}, line_2 Y_{max}...line_4 Y_{max})$$
$$Box_{日\ Y\_min} = Min(line_1 Y_{min}, line_2 Y_{min}...line_4 Y_{min})$$

Max means maximum value. The exact external rectangle 61 includes the four extreme values $Box日_{X\_max}$, $Box日_{X\_min}$, $Box日_{Y\_max}$ and $Box日_{Y\_min}$ at four sides of the exact external rectangle, as shown in FIG. 3.

Secondly, the exact external rectangle for 月 is calculated as following. The extreme values at four sides of the exact external rectangle of the component 月 is calculated, that is:

$$Box_{月\ X\_max} = Max(line_5 X_{max}, line_6 X_{max}...line_8 X_{max})$$
$$Box_{月\ X\_min} = Min(line_5 X_{min}, line_6 X_{min}...line_8 X_{min})$$
$$Box_{月\ Y\_max} = Max(line_5 Y_{max}, line_6 Y_{max}...line_8 Y_{max})$$
$$Box_{月\ Y\_min} = Min(line_5 Y_{min}, line_6 Y_{min}...line_8 Y_{min})$$

Max means maximum value. The exact external rectangle 62 includes the four extreme values $Box月_{X\_max}$, $Box月_{X\_min}$, $Box月_{Y\_max}$, $Box月_{Y\_min}$ at four sides of the exact external rectangle, as shown in FIG. 3.

(B) Calculation of a Mass Center

In the present invention, the mass centers of Chinese characters, components, and strokes are calculated. Firstly, we desire to cause that every stroke has identical density for the sampling points per unit length.

This is because the writing speed of each stroke is not identical so that the density of the sampling points for the unit length is not identical.

The length of each stroke is:

$$d_n = \sum_{i=1}^{n} \sqrt{(x_1 - x_{i-1})^2 + (y_i - y_{i-1})^2}$$

Where $d_n$ is a sum of the distances from points $(x_1, y_1)$ to points $(x_n, y_n)$.

Then the number of sampling points in the stroke is:

$$N_{density} = \left[\frac{2d_{n-1} + \text{density}}{2\text{density}}\right]$$

Then $$\alpha = \begin{cases} d_{i+1} - \frac{i * d_{n-1}}{n*(d_{i+1} - d_i)}, & N_{density} * (i+1) \geq i*n - 1 \\ 1, & N_{density} * (i+1) < i*n - 1 \end{cases}$$

$$\begin{cases} x_j = x_i * \alpha + x_{i+1} * (1 - \alpha) \\ y_j = y_i * \alpha + y_{i+1} * (1 - \alpha) \end{cases}$$

After above calculation, the stroke could be expressed as:

$$\text{line} = p_0(x_0, y_0), p_1(x_1, y_1), \ldots, p_{N_{density}}(x_{N_{density}}, y_{N_{density}})$$

Then the mass center M of the stroke is as following:

$$M_x = \sum_{j=1}^{n} x_j$$

$$M_y = \sum_{j=1}^{n} y_j$$

Then the text feature of the present invention is calculated as following:

(3) Derivation of Text Feature:

In the present invention, the text features of Chinese characters (including template Chinese character and handwriting Chinese character) is acquired as in the following way. In the following division of 田 (pronounced as tin) means to divide an exact external rectangle into four equal lattice which is like the 田 structure.

Text feature 1: for one component of a Chinese character, an exact external rectangle thereof is equally divided into four equal lattices like a shape of 田.. For each lattice, if the Chinese character is occupied in that lattices, the lattice is applied with a value of 1, while if not occupied in that lattice, the lattice is applied with a value of 0.

Text feature 2: Based on the division shown in text feature 1, a mass center of an exact external rectangle of a component of a Chinese character is acquired, if the mass center is occupied in a specific one of the four lattices, the lattice is given a value 1, otherwise, the lattice is given a value of 0.

Text feature 3: For the four lattices of a E division of an exact external rectangle of a component of a Chinese character, for a lattice which is occupied by a mass center of the component of the Chinese character, the lattice is given a value of 1, and otherwise, a value of 0 is given.

Text feature 4: For the four lattices of a 田 division of an exact external rectangle of a component of a Chinese character, for every stroke of the component, for the lattices which are occupied by the stroke of the component, the lattices are given a value of 1, otherwise, a value of 0 is given.

Text feature 5: If an exact external rectangle of a component of a Chinese character is in contact with a boundary of the exact external rectangle of the Chinese character, then it is given a value of 1, otherwise a value of 0 is given.

Text feature 6: A vector formed between a mass center of a component of a Chinese character and another mass center of another component of the Chinese character is positioned in a center of a coordinate, then the coordinate is divided into four quadrants (which divides a coordinate into four parts by two vertical axis), or is divided into eight quadrants which divides a coordinate into eight parts by four axis, the angle between two adjacent axis is 45 degrees). For all the quadrants of the coordinate, if the vector is laid in one quadrant, than the quadrant is given with a value of 1, otherwise given a value of 0.

Text feature 7: Whether the exact external rectangles of each two components of a Chinese character is overlapped, if yes, a value of 1 is given, otherwise a value of 0 is given.

Text feature 8: Two exact external rectangles of two components of a Chinese character are arranged to be contacted with the positive x axis and the positive y axis and then an overlapping rectangle is formed by overlapping of the two exact external rectangles, whether a height of this overlapping rectangle is higher than ⅔ of a height of one exact external rectangle with larger height? And a width of this overlapping rectangle is wider than ⅔ of a width of one exact external rectangle with large width? If both exist, then a value of 1 is given, otherwise a value of zero is given.

Text feature 9: Two exact external rectangles of two components of a Chinese character are arranged to be contacted with the positive x axis and the positive y axis and then an overlapping rectangle is formed by overlapping of the two exact external rectangles. Whether an area of the overlapping exact external rectangular is larger than ⅔ of a small one of the two exact external rectangles, if yes, a value of 1 is given, otherwise, a value of 0 is given. Whether an area of the overlapping exact external rectangular is larger than ⅓ of a large one of the two exact external rectangles, if yes, a value of 1 is given, otherwise, a value of 0 is given.

Text feature 10: A ratio of a height of an exact external rectangle of a component of a Chinese character with respect to a height of an exact external rectangle of another component of the Chinese character is greater than 3 or smaller than ⅓, if yes, a value of 1 is given, otherwise, a value of 0 is given.

Text feature 11: an exact external rectangle of a component of a Chinese character is divided into 9 rectangles of equal area, for the rectangles at a left upper side, a middle, and a right lower side, whether these rectangles exist for other components of the Chinese character, if yes, a value of 1 is given, otherwise, a value of 0 is given.

In the present invention, for a specific Chinese character, a plurality of template Chinese characters (for instance, 20) for this specific Chinese character are generated, that is, various handwriting traces of Chinese characters used as samples are generated. The exact external rectangle and mass of the template Chinese character and components of these template Chinese characters are calculated in advance. Then the above 11 text features are calculated for these template Chinese characters. If for a text feature, if all the template Chinese characters have the same values, it is considered that this Chinese character owns this feature. About 11 text features are calculated for these template Chinese characters. The text features owned by these template Chinese characters are formed as a feature set of these template Chinese characters (step 250). All the feature sets of various sampled Chinese characters are stored in a feature set database 35 (step 260).

A tested handwriting Chinese character collector 40 is connected to the feature classifier 30 for collecting handwriting Chinese characters to be tested (step 310). The exact external rectangles and mass centers of these handwriting Chinese characters to be tested are calculated (step 320), which are inputted to the feature classifier 30 and the text features 1 to 11 above said for these handwriting Chinese characters to be tested are calculated (step 330).

A feature comparator 50 is connected to the feature classifier 30 and the feature set database 35. The feature comparator 50 acquires text features 1 to 11 of the handwriting Chinese character from the feature classifier 30. Then the feature comparator 50 compares the text features of a handwriting Chinese character to be tested with the features set of the sampled template Chinese character originally stored in the feature set database 35 are compared. If they match completely, it is said that the handwriting Chinese character to be tested is correct (step 400), and the result is outputted (step 410).

Advantages of the present invention are that: in the present invention, the text features 1 to 11 of sampled template Chinese characters are calculated and stored in the feature set database. Then the text features of a handwriting Chinese character to be tested is also calculated. Then the two text features are compared, if they match, it is considered that the handwriting Chinese character to be tested has a correct handwriting way for the Chinese character. The result is feedback to the user. Therefore, the faults of the writer can be indicated in time as the user writes a Chinese character. Therefore, the present invention is helpful for learning Chinese. A learner can know whether the Chinese character written now is correct or wrong in real time. As a result, learning efficiency is promoted quickly.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A system for determining correction of handwriting Chinese characters, including:
   a Chinese character collector for collecting template Chinese characters which is inputted by handwriting; components of the template Chinese characters are correct component structures;
   a pre-processor connected to the Chinese character collector for pre-processing the template Chinese characters;
   a feature classifier connected to the pre-processor for automatically classifying features of the template Chinese characters; that is, to obtain a rectangle frame of each component of a Chinese character and to calculate a mass center of the rectangle frame; then text features of the template Chinese characters are acquired by a program; text features of different template Chinese characters expressing the same Chinese character are compared; if for the same Chinese character, the template Chinese characters have the same text feature, then the same text feature is marked as a necessary text feature of the Chinese character; results from the comparison are stored as a template of the text feature of the Chinese character;
   a tested handwriting Chinese character collector connected to the feature classifier for collecting the handwriting Chinese characters to be tested; exact external rectangles and mass centers of the handwriting Chinese characters to be tested being calculated, which are inputted to the feature classifier for calculating text features for of the handwriting Chinese characters to be tested;
   a feature comparator connected to the feature classifier and a feature set database; the feature comparator acquiring the text features of the handwriting Chinese characters to be tested from the feature classifier; then the feature comparator comparing the text features of a handwriting Chinese character to be tested with feature sets of the template Chinese characters originally stored in the feature set database are compared; if they match completely, it is said that the handwriting Chinese character to be tested is correct.

2. The system for determining the correction of the handwriting Chinese characters, as claimed in claim 1, wherein the pre-processing includes processes of data enhancement, generating a plurality of template Chinese characters based on the collected template Chinese characters of the Chinese character collector, standardization and interpolation of the handwriting Chinese characters.

3. The system for determining the correction of the handwriting Chinese characters as claimed in claim 1, wherein the feature classifier analyzes one Chinese character to get the text features of the one Chinese character, some of the text features of the one Chinese character are necessary and others are unnecessary; necessary text features are captured and unnecessary text features are deserted.

4. The system for determining the correction of the handwriting Chinese characters as claimed in claim 1, wherein calculation of an exact external rectangle includes calculation of a whole Chinese character and components of the whole Chinese character.

5. The system for determining the correction of the handwriting Chinese characters as claimed in claim 4, wherein the mass centers of the whole Chinese character, the components of the whole Chinese character, and strokes are calculated.

6. The system for determining the correction of the handwriting Chinese characters as claimed in claim 1, wherein the feature classifier causes every stroke to have an identical density for sampling points in each stroke per unit length; in that a length of each stroke is:

$$d_n = \sum_{i=1}^{n} \sqrt{(x_i - x_{i-1})^2 + (y_i - y_{i-1})^2}$$

where $d_n$ is a sum of distances from points $(x_1, y_1)$ to points $(x_n, y_n)$ then a number of the sampling points in the stroke is:

$$N_{density} = \left[\frac{2d_{n-1} + \text{density}}{2\text{density}}\right]$$

then $$\alpha = \begin{cases} d_{i+1} - \frac{i * d_{n-1}}{n * (d_{i+1} - d_i)}, & N_{density} * (i+1) \geq i * n - 1 \\ 1, & N_{density} * (i+1) < i * n - 1 \end{cases}$$

$$\begin{cases} x_j = x_i * \alpha + x_{i+1} * (1 - \alpha) \\ y_j = y_i * \alpha + y_{i+1} * (1 - \alpha) \end{cases}$$

after calculation of the density, the stroke could be expressed as:

$$\text{line} = p_0(x_0, y_0), p_1(x_1, y_1), \ldots, p_{N_{density}}\left(x_{N_{density}}, y_{N_{density}}\right)$$

then a mass center M of the stroke is the following:

$$M_x = \sum_{j=1}^{n} x_j$$

$$M_y = \sum_{j=1}^{n} y_j.$$

\* \* \* \* \*